(12) United States Patent
Sato

(10) Patent No.: US 7,786,614 B2
(45) Date of Patent: Aug. 31, 2010

(54) SEMICONDUCTOR DEVICE OF POWER COMPENSATION

(75) Inventor: Tomio Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 12/199,493

(22) Filed: Aug. 27, 2008

(65) Prior Publication Data

US 2009/0058514 A1 Mar. 5, 2009

(30) Foreign Application Priority Data

Sep. 5, 2007 (JP) ............................. 2007-230712

(51) Int. Cl.
*H02J 1/00* (2006.01)
(52) U.S. Cl. ....................................................... 307/30
(58) Field of Classification Search .................... 307/30
See application file for complete search history.

(56) References Cited

U.S. PATENT DOCUMENTS 6,535,075 B2 * 3/2003 Frech et al. ................. 333/17.1

OTHER PUBLICATIONS

Y. Nakamura et al.; "An On-Chip Noise Canceller with High Voltage Supply Lines for Nanosecond-Range Power Supply Noise"; Symposium on VLSI Circuits, pp. 124-125, 2007.
L. Amoroso et al.; "Single Shot Transient Suppressor (SSTS) for High Current High Slew Rate Microprocessor", Applied Power Electronics Conf. and Exposition, vol. 1, pp. 284-288, Mar. 1999.

* cited by examiner

*Primary Examiner*—Robert L. DeBeradinis
(74) *Attorney, Agent, or Firm*—Arent Fox LLP

(57) ABSTRACT

According to an aspect of an embodiment, a semiconductor device includes: a reference line; a first line provided with a first voltage with respect to the reference line; a second line provided with a second voltage not less than the first voltage with respect to the reference line; a capacitor having a first capacitance arranged between the reference line and second line; a current limiting element arranged between the capacitor and the second line, for charging up the capacitor, the current limiting element limiting current flowing into the capacitor from the second line during charging up; a first switch connected between the first line and the capacitor; and a controller for controlling the first switch to discharge the capacitor.

12 Claims, 9 Drawing Sheets

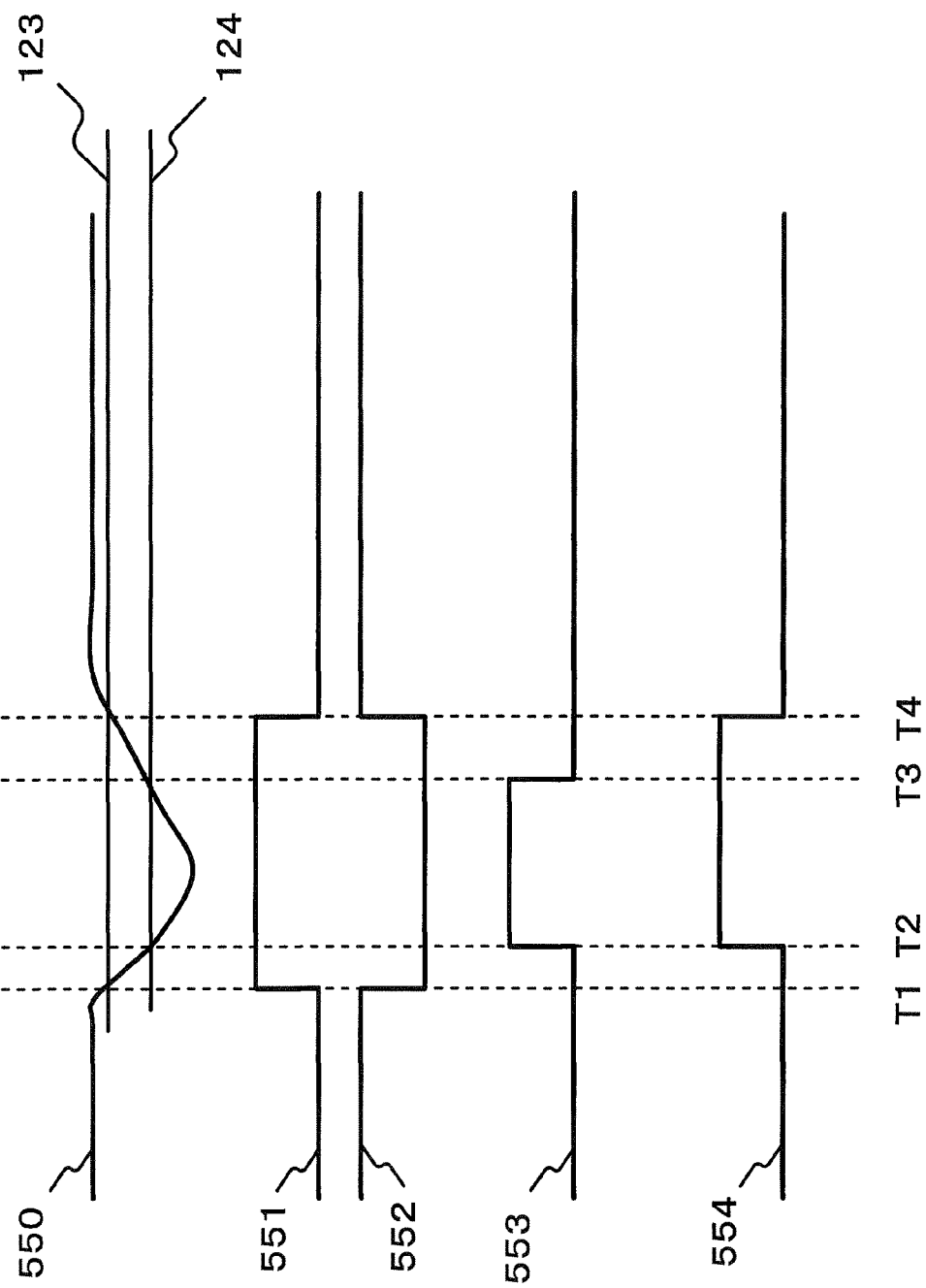

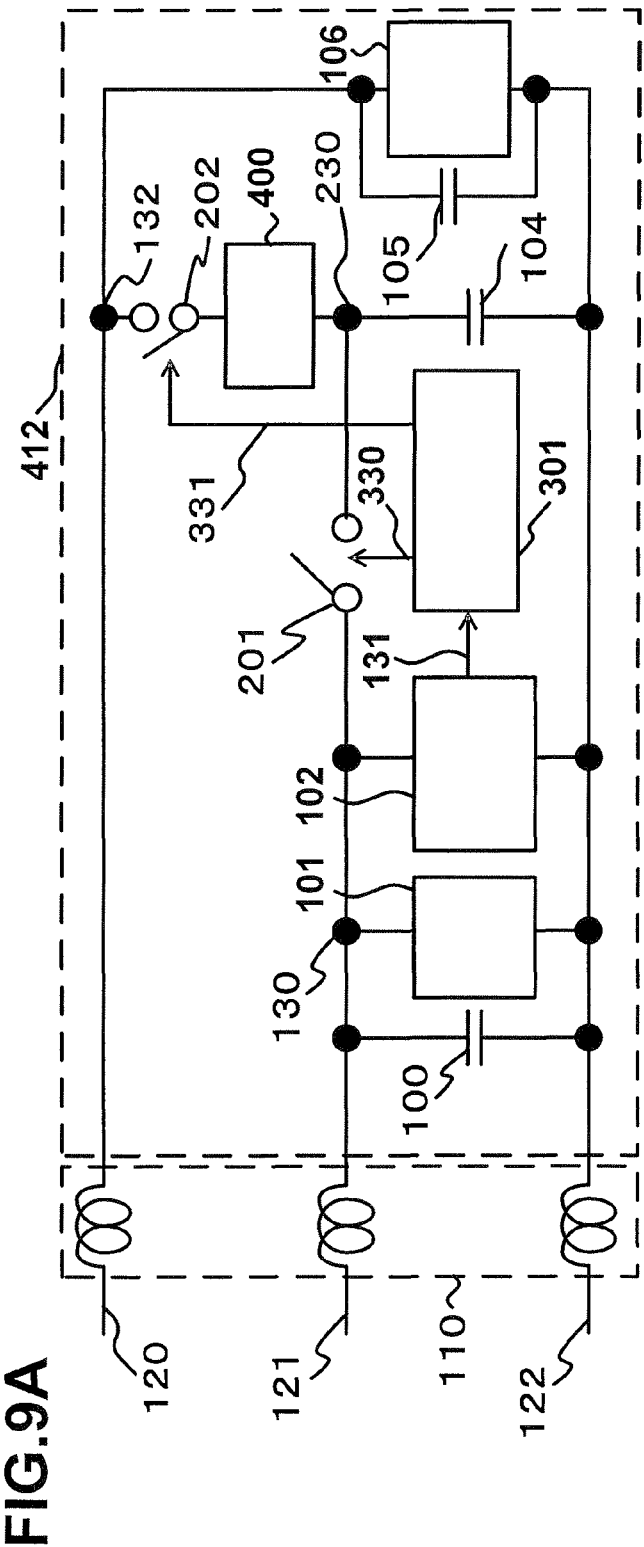
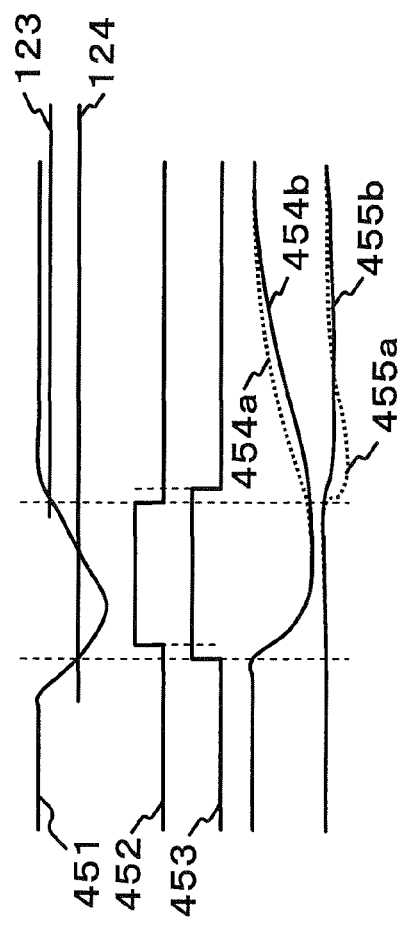
FIG.9A
FIG.9B

SEMICONDUCTOR DEVICE OF POWER COMPENSATION

CROSS-REFERENCE TO RELATED APPLICATION

This application is based upon and claims the benefit of priority of the prior Japanese Patent Application No. 2007-230712 filed on Sep. 5, 2007, the entire contents of which are incorporated herein by reference.

BACKGROUND

1. Technical Field

This art is related to a power compensation for a circuit.

2. Background

Recent integrated circuits tend to lower an operating voltage in order to meet needs for high speed operation, whereas the current consumptions in the integrated circuits tend to increase with an increase in scale.

To keep the power consumption of a large scale integrated circuit low, a power-gating technique, a clock-gating technique, and a dynamic potential control technique are available. Those technique cause an increase in power supply noise generated when a circuit switches from a sleep mode to an active mode.

To cope with the increase in power supply noise, a high voltage power supply, a switch, and a level shifter are mounted on a power supply circuit. Accordingly, when a logic circuit wakes up, the level shifter allows the switch to be turned on to connect the logic circuit to the high voltage power supply, thus charging a decoupling capacitor connected in parallel to the logic circuit. Consequently, power supply voltage variation in the logic circuit can be suppressed upon waking up. Such a method of suppressing power supply voltage variation is disclosed in, for example, Y. Nakamura et al. "An On-Chip Noise Canceller with High Voltage Supply Lines for Nanosecond-Range Power Supply Noise", Symposium on VLSI Circuits, pp. 124-125, FIG. 1, 2007.

In addition, an auxiliary decoupling capacitor, a power supply having a potential higher than that of a power supply driving a microprocessor, and a switch are mounted on the power supply circuit. The auxiliary decoupling capacitor is charged by the power supply. When the microprocessor enters a transient state, the switch is turned on, so that current is supplied from the auxiliary decoupling capacitor to the microprocessor. Consequently, the current supplied from the decoupling capacitor to the microprocessor can be suppressed, thus preventing a voltage spike from occurring when the microprocessor enters the transient state. Such a method of suppressing a voltage spike is disclosed in, for example, L. Amoroso et al. "Single Shot Transient Suppressor (SSTS) for High Current High Slew Rate Microprocessor", Applied Power Electronics Conf. and Exposition, vol. 1, pp. 284-288, FIG. 3.1, March 1999.

In the above-described method of suppressing power supply voltage variation, however, the high voltage power supply supplies current to the decoupling capacitor in a chip through an inductor arranged outside the chip. Accordingly, the charging time of the decoupling capacitor through the high voltage power supply depends on the resonant frequency of the inductor and the decoupling capacitor. Since the inductance of the inductor outside the chip is very high, it is difficult for the logic circuit operating at high speed to ensure an adequate charging rate. Unfortunately, the power supply voltage varies.

In the above-described method of suppressing a voltage spike, the current is supplied from the auxiliary decoupling capacitor, having a capacitance Ce, to the microprocessor through a resistor whose resistance R1 is parasitic on a transistor switch. Therefore, the charging time of the decoupling capacitor, having a capacitance Cd, of the microprocessor is determined by the time constant of the capacitance Ce of the auxiliary decoupling capacitor and the resistance R1. The capacitance Ce needs to be very high. The time constant is obtained as the product of the capacitance Ce and the resistance R1. Therefore, it is difficult to quickly suppress a voltage spike.

SUMMARY OF THE INVENTION

According to an aspect of an embodiment, a semiconductor device includes: a reference line; a first line provided with a first voltage with respect to the reference line; a second line provided with a second voltage not less than the first voltage with respect to the reference line; a capacitor having a first capacitance arranged between the reference line and second line; a current limiting element arranged between the capacitor and the second line, for charging up the capacitor, the current limiting element limiting current flowing into the capacitor from the second line during charging up; a first switch connected between the first line and the capacitor; and a controller for controlling the first switch to discharge the capacitor.

BRIEF DESCRIPTION OF THE DRAWINGS

FIG. 6 shows a waveform chart of the semiconductor circuit;
FIG. 9A shows a diagram of a semiconductor device;
and
FIG. 9B shows a waveform chart of an operation.

DESCRIPTION OF THE PREFERRED EMBODIMENTS

Embodiments will be described below. The present invention is not limited to the following embodiments.

Figure 1A:
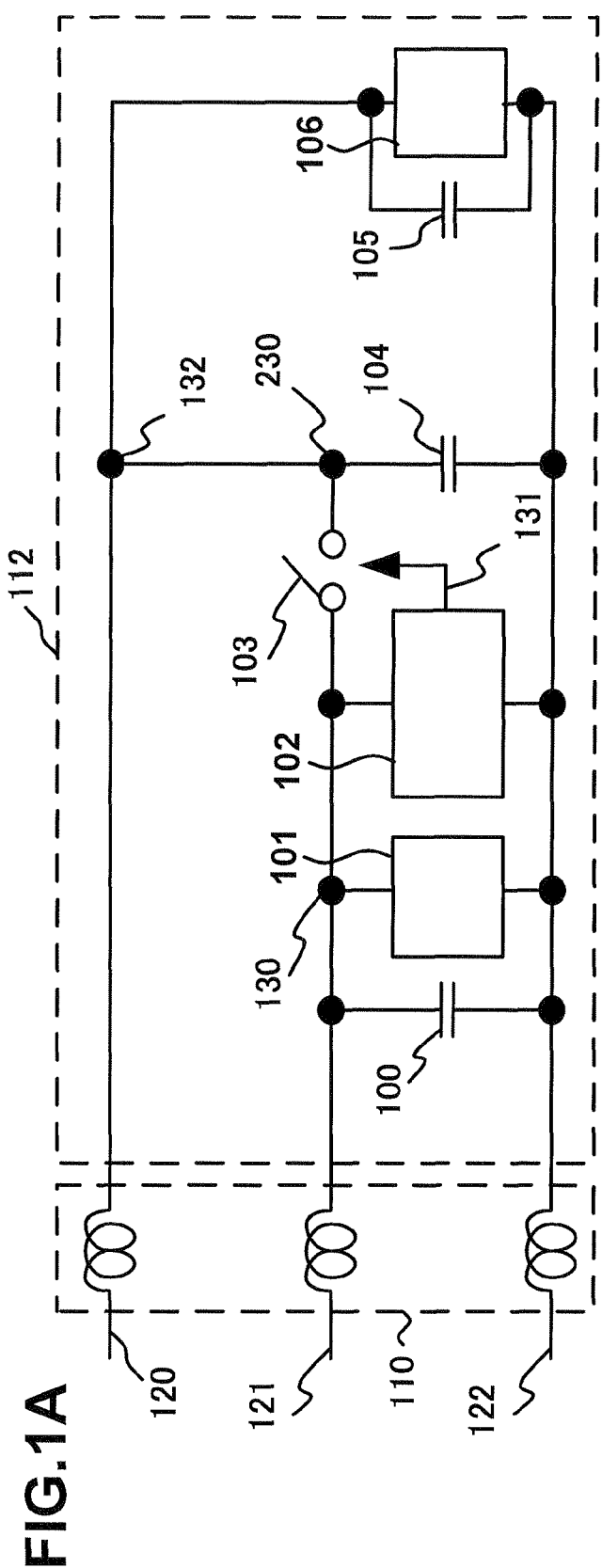
FIG. 1A shows a diagram of a semiconductor device.
Figure 1B:
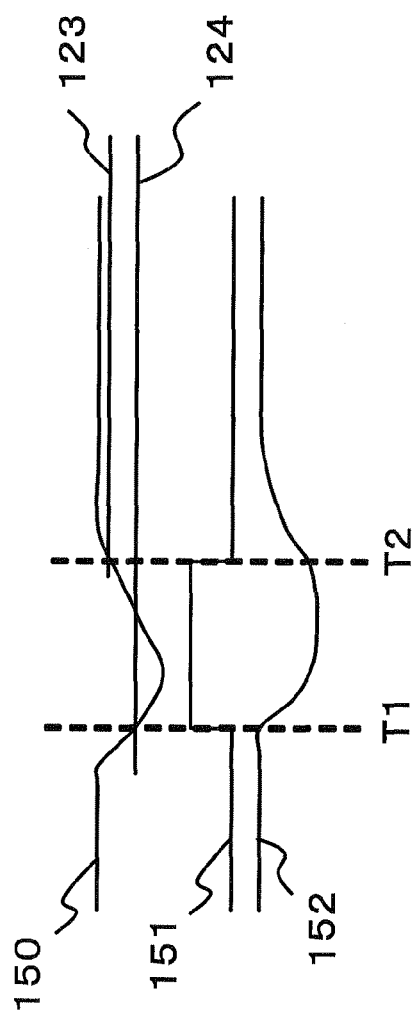
FIG. 1B shows a waveform chart of an operation.

FIG. 1A shows a diagram of a semiconductor device and FIG. 1B shows a waveform chart of an operation thereof. The semiconductor device is composed of two major parts, i.e. a package 110 and a semiconductor circuit 112. The package 110 is represented as an equivalent circuit including inductive elements resulting from the package of the semiconductor device, e.g. a lead frame constituting part of the package. The semiconductor device includes lines 120, 121, and 122 for power supply. The line 121 is supplied with a first voltage based on the line 122 as a reference. The line 120 is supplied with a second voltage based on the line 122 as the reference. The second voltage is equal to or higher than the first voltage. The line 122 may be a ground line.

The semiconductor circuit 112 includes a circuit 101, a circuit 106, and a power compensating circuit that suppresses power supply variation. The circuit 101 and a capacitor 100 are connected to the lines 121 and 121 such that each component is arranged between those lines. The circuit 101 includes, for example, a microprocessor unit which switches between a sleep mode and an active mode. The capacitor 100 is illustrated as a special-purpose element in FIG. 1A, but may be considered as a line capacitive element between the lines 121 and 122 or a capacitive element possessed by the entire circuit 101. The capacitor 100 may be mounted in the circuit 101. The circuit 106 and a capacitor 105 are connected to the lines 120 and 122 such that each component is arranged between those lines. The capacitor 105 may be considered as a line capacitive element between the lines 120 and 122 or a capacitive element possessed by the entire circuit 106. The capacitor 105 may be mounted in the circuit 106. In the typical semiconductor circuit 112, the circuit 101 serves as a core section and the circuit 106 serves as an input/output (I/O) section. In the semiconductor device that operates at high speed, a power supply voltage for the I/O section is often higher than that for the core section.

The above-described power compensating circuit includes a controller 102, a switch 103, and a capacitor 104. The controller 102 is connected to the lines 121 and 122 such that the unit is arranged between the lines 121 and 122. The controller 102 outputs a signal 131 in response to a variation in voltage across the lines 121 and 122. The capacitor 104 is connected to the lines 120 and 122 such that the capacitor 104 is arranged between the lines 120 and 122. The switch 103 is connected to a node 230 and a node 130 such that the switch is arranged between the node 230 and the node 130. The switch 103 is turned on or off in response to a signal output from the controller 102. The switch 103 can be mounted as, for example, an n-type MOS transistor. The controller 102 controls the switch 103 to temporality discharge the capacitor 104 so as to compensate for fluctuation of the voltage level of the line 121.

A waveform 150 represents the waveform of a voltage at the node 130, a waveform 151 represents the waveform of a voltage of the signal 131, and a waveform 152 represents the waveform of a voltage at a node 132. Threshold values 123 and 124 indicate threshold voltages detected by the controller 102. An operation of the semiconductor circuit 112 will now be described below.

Cases causing voltage variations include, for example, switching between the sleep and active modes. It is assumed that only when being required to operate high speed, the circuit 101 enters the active mode with high power consumption, and the circuit 101 operates in the sleep mode with low power consumption at all other times. While the circuit 101 is in the sleep mode, a large voltage variation does not occur at the node 130 and the switch 103 is opened. At that time, the capacitor 104 is connected to the line 120 via the node 132 and is charged by the voltage supplied from the line 120. The switch 103 is turned off. When the circuit 101 switches from the sleep mode to the active mode, the power consumption of the circuit 101 sharply increases, so that the voltage at the node 130 decreases. When the voltage indicated by the waveform 150 is lower than the threshold voltage 124 at time T1, the controller 102 detects the fact and outputs the signal 131, indicated by the waveform 151, to close the switch 103. The switch 103 is turned on in response to the signal 131. When the switch 103 is turned on, charge stored in the capacitor 104 flows into the capacitor 100, thus charging the capacitor 100.

At time T2, the capacitor 100 is charged and the voltage at the node 130 is returned to the threshold voltage 123, as indicated by the waveform 150. The controller 102 detects the fact and transmits the signal 131 to the switch 103 at time T2 to open the switch. The switch 103 is turned off in response to the signal 131 transmitted from the controller 102. When the switch 103 is turned off, the capacitor 104 is charged by the second voltage supplied from the line 120. When charging the capacitor 104 is completed, the voltage at the node 132 is returned to the voltage supplied from the line 120, as shown by the waveform 152.

An optimum value for the capacitor 104 is calculated in the following manner. Let C1 denote the capacitance of the capacitor 100 and let C2 indicate that of the capacitor 104. When the voltage at the node 130 is lower than a potential V1 supplied from the line 121 by an amount $\Delta V$, the charge stored as the capacitance C1 before the voltage at the node 130 is returned to the potential V1 (hereinafter, referred to as "voltage return") is expressed as follows:

$$C1 \times (V1 - \Delta V)$$

where $\Delta V$ is the difference between, for example, the first voltage and the threshold voltage 124. Since the threshold voltage 124 is a design value of the controller 102, the value $\Delta V$ can be obtained from the design value.

On the other hand, the charge stored as the capacitance C2 before the voltage return is expressed as follows.

$$C2 \times V2$$

The sum of the capacitances C1 and C2 after the voltage return is expressed as follows.

$$(C1 + C2) \times V1$$

Since the sum of the capacitances before the voltage return is the same as that after the voltage return, the capacitance C2 can be defined as follows.

$$C2 = C1 \times \Delta V / (V2 - V1)$$

In other words, the capacitance C2 is equal to a value obtained by dividing the product of the capacitance C1 and the value $\Delta V$ by the difference between the potentials V2 and V1. In this embodiment, for example, when V1=1.2 V, V2=3.3 V, $\Delta V$=100 mV, and C1=5 nF, the capacitance C2 is 240 pF that is approximately one twentieth of the capacitance C1. A minimum capacitance necessary for voltage return is calculated as described above, so that the capacitance C2 can be set to a very small value. Consequently, the capacitor 104 can be mounted in the semiconductor device. The capacitor 104 is arranged close to the capacitor 100, so that the time required to charge the capacitor 100 through the capacitor 104 is not affected by the inductances in the package. Accordingly, the charging time of the capacitor 100 is 2.5 ns, which is obtained using the time constant of the capacitance C1 and the on-resistance R of the switch 103, i.e. the product of C1 and R. Therefore, even when the circuit 101 operates at a high speed of 100 MHz or more, an adequate charging rate can be ensured in accordance with this embodiment.

According to this embodiment, if the first voltage is equal to or lower than a predetermined value, the capacitor is connected between the first line and the second line, so that a variation in the first voltage can be suppressed by charge stored in the capacitor. Consequently, a variation in power supply voltage supplied to, for example, a logic circuit can be suppressed, thus enabling the semiconductor device to operate stably.

Referring to FIGS. 1A and 1B, when the switch 103 is turned on at time T1, the potential at the node 132 remarkably decreases as shown by the waveform 152 in order to charge the capacitor 104. The node 132 is also connected to the circuit 106. A variation in potential at the node 132 causes the circuit 106 to malfunction. An object of the present embodiment is to suppress a variation in power supply voltage supplied to the circuit 101 caused when the mode of the circuit 101 is switched to the other mode. The number of mode switching times is approximately 100 times per second at the maximum. After the mode is switched to the other mode, charging the capacitor 104 may be completed until the next mode switching.

Figure 2A:
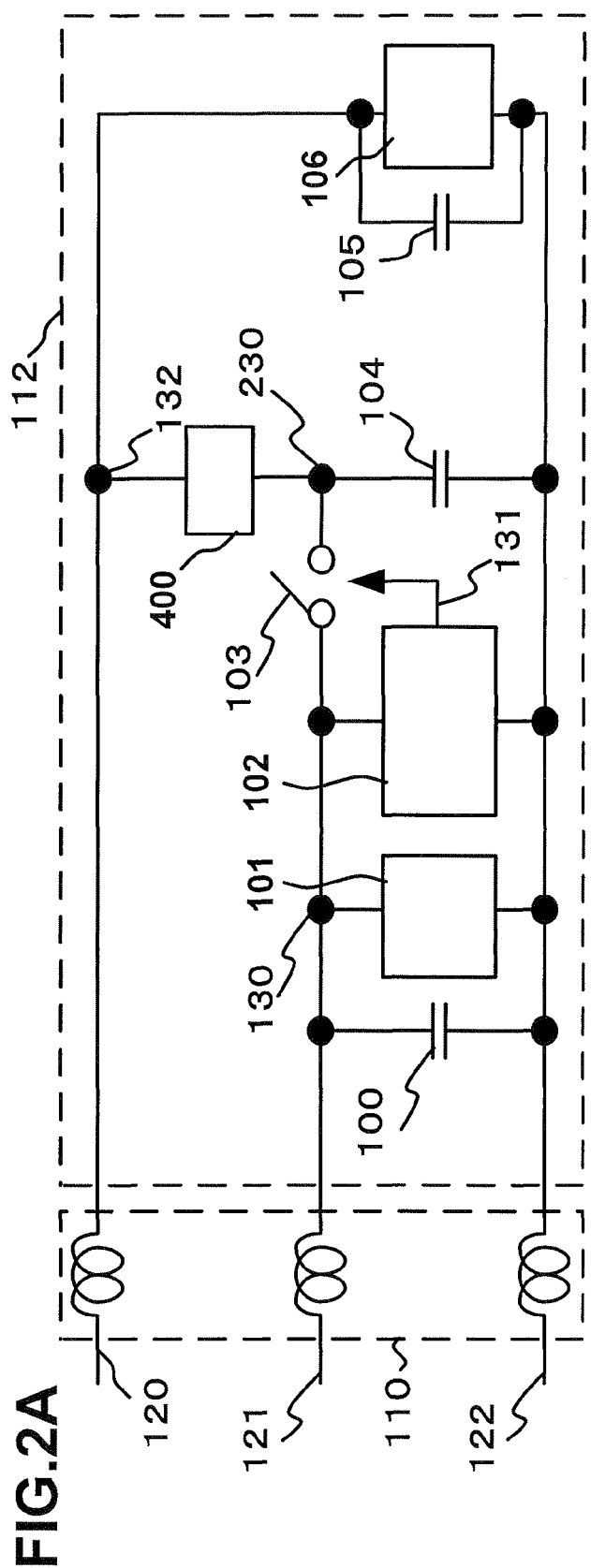
FIG. 2A shows a diagram of a semiconductor device.
Figure 2B:
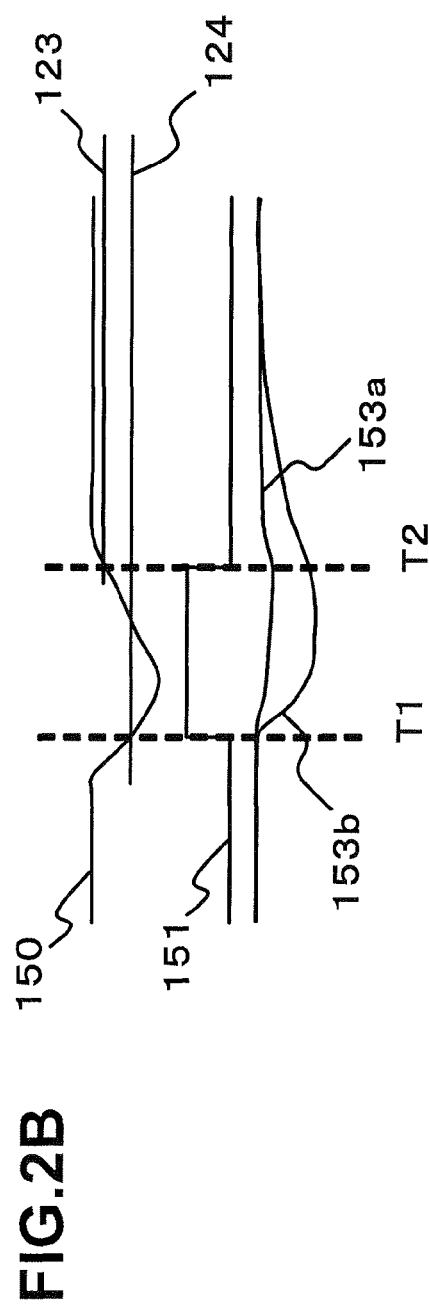
FIG. 2B shows a waveform chart of an operation.

FIG. 2A shows a diagram of the semiconductor device further including a current limiting element 400 which is arranged between the nodes 132 and 230 and FIG. 2B shows a waveform chart of an operation of the semiconductor device. A waveform 153a indicates the waveform of a voltage at the node 132 and a waveform 153b represents the waveform of a voltage at the node 230. In FIG. 2A, the same components as those in FIG. 1A are designated by the same reference numerals and a description of the previously described components is omitted.

The current limiting element 400 limits the amount of current flowing from the node 132 into the capacitor 104 in a manner similar to the current limiting element 400 in FIG. 9A, which will be described later. Consequently, the rate of charging the capacitor 104 is lowered as shown by the voltage waveform 153b, but a variation in voltage at the node 132 can be reduced as shown by the waveform 153a.

In this embodiment, assuming that the current limiting element 400 includes a resistive element having a resistance R, the charging time of the capacitor 104 is determined by the time constant CR of the resistance R and the capacitance C of the capacitor 104. As described above, charging the capacitor 104 may be completed until the next mode switching of the circuit 101. Accordingly, if the mode switching period T of the circuit 101 is known, the settable resistance R can be obtained as follows.

$$C \times R \leq T$$

In this embodiment, the controller 102 has been described as a circuit that directly monitors a voltage between two power supply lines. Alternatively, the controller 102 may be a circuit that monitors, for example, current consumption in the circuit 101 to detect a sharp increase in current consumption.

In the above-described embodiment, when the switch 103 in FIG. 1A is turned on, the capacitor 104 is discharged. Accordingly, the potential at the node 132 decreases from time T1, as shown by the voltage waveform 152 in FIG. 1B, until the capacitor 104 is recharged by the second voltage supplied from the line 120. Even after time T2, the potential at the node 132 is not immediately returned to the voltage supplied from the line 120.

Figure 3A:
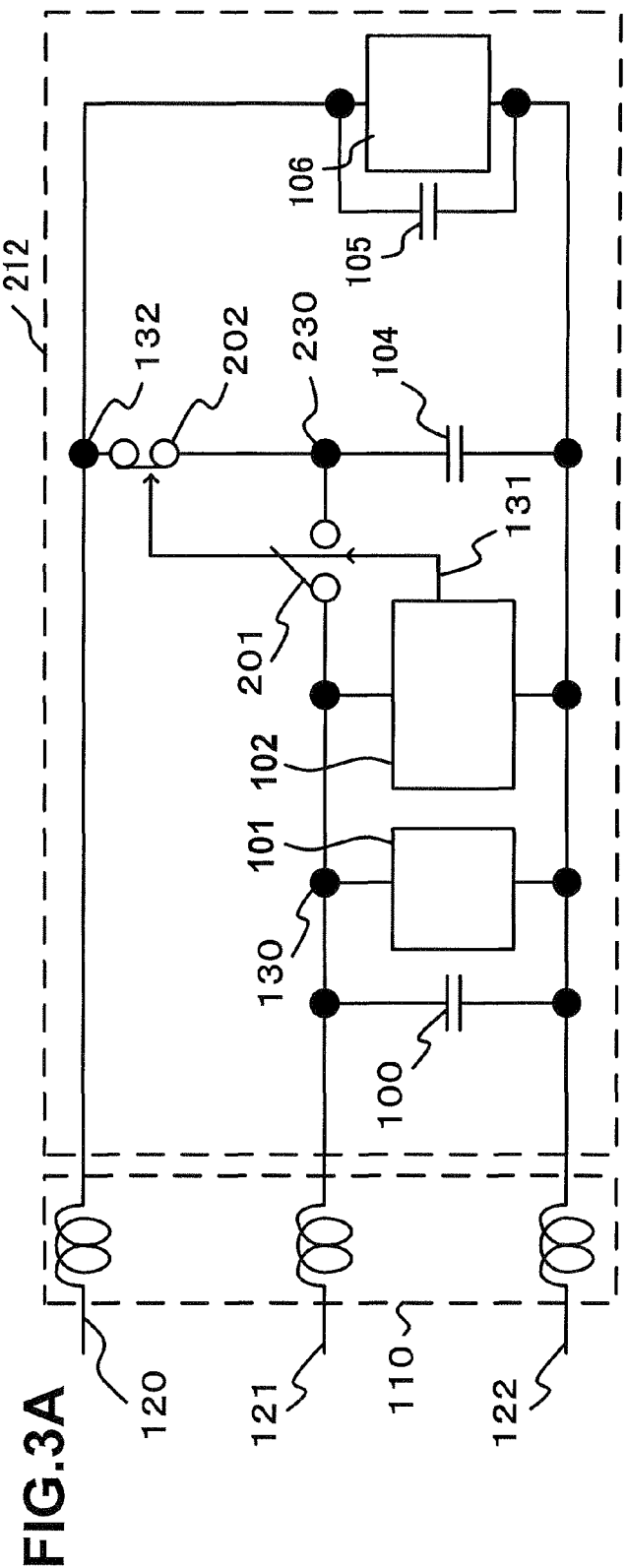
FIG. 3A shows a diagram of a semiconductor device.
Figure 3B:
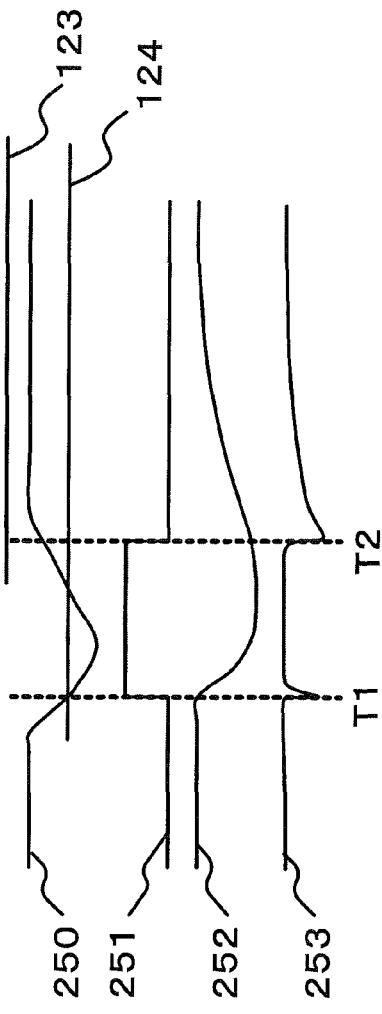
FIG. 3B shows a waveform chart of an operation.

FIG. 3A shows a diagram of a semiconductor device and FIG. 3B shows a waveform chart of an operation thereof. Referring to FIG. 3A, a semiconductor circuit 212 includes the lines 120, 121, and 122, the circuits 101 and 106, the capacitors 100, 104, and 105, and the controller 102 in the same case as the semiconductor circuit 112 in FIG. 1A. The semiconductor circuit 212 further includes a switch 201 in the same position as that of the switch 103 in FIG. 1A. In FIG. 3A, the same components as those in FIG. 2A are designated by the same reference numerals and a description thereof is omitted.

Referring to FIG. 3A, the semiconductor circuit 212 includes a switch 202 functioning as the current limiting element 400 in FIG. 2A. The switch 202 is controlled by the controller 102 in the same way as the switch 201. Specifically, the switches 201 and 202 are controlled in accordance with the signal 131 output from the controller 102 so that when one of the switches 201 and 202 is turned off, the other one is turned on. In the waveform chart, a waveform 250 represents the waveform of a voltage at the node 130, a waveform 251 represents the waveform of a voltage of the signal 131, and a waveform 253 represents the waveform of a voltage at the node 132. An operation of the semiconductor circuit 212 will be described below.

When there is no large voltage variation at the node 130 in the circuit 101, the switch 202 is closed, so that the capacitor 104 is charged by the second voltage supplied from the line 120. When the circuit 101 switches from the sleep mode to the active mode, current consumption in the circuit 101 increases, so that a voltage at the node 130 decreases. When a voltage at the node 130 is equal to or lower than the threshold voltage 124, the controller 102 changes an output level of the signal 131. In response to the signal 131, the switch 201 is turned on and the switch 202 is turned off. Consequently, the capacitor 100 is charged through the capacitor 104.

When the capacitor 100 is charged and the voltage at the node 130 is returned to the threshold voltage 123 as shown by the waveform 250, the controller 102 changes the output level of the signal 131 at time T2 as shown by the waveform 251. In response to the signal 131, the switch 201 is turned off and the switch 202 is turned on. Consequently, the capacitor 104 is recharged by the second voltage supplied from the line 120. As described above, when the power consumption of the circuit 101 increases, the switch 202 is opened, so that a voltage variation at the node 132 can be suppressed as shown by the waveform 253.

Figure 4:
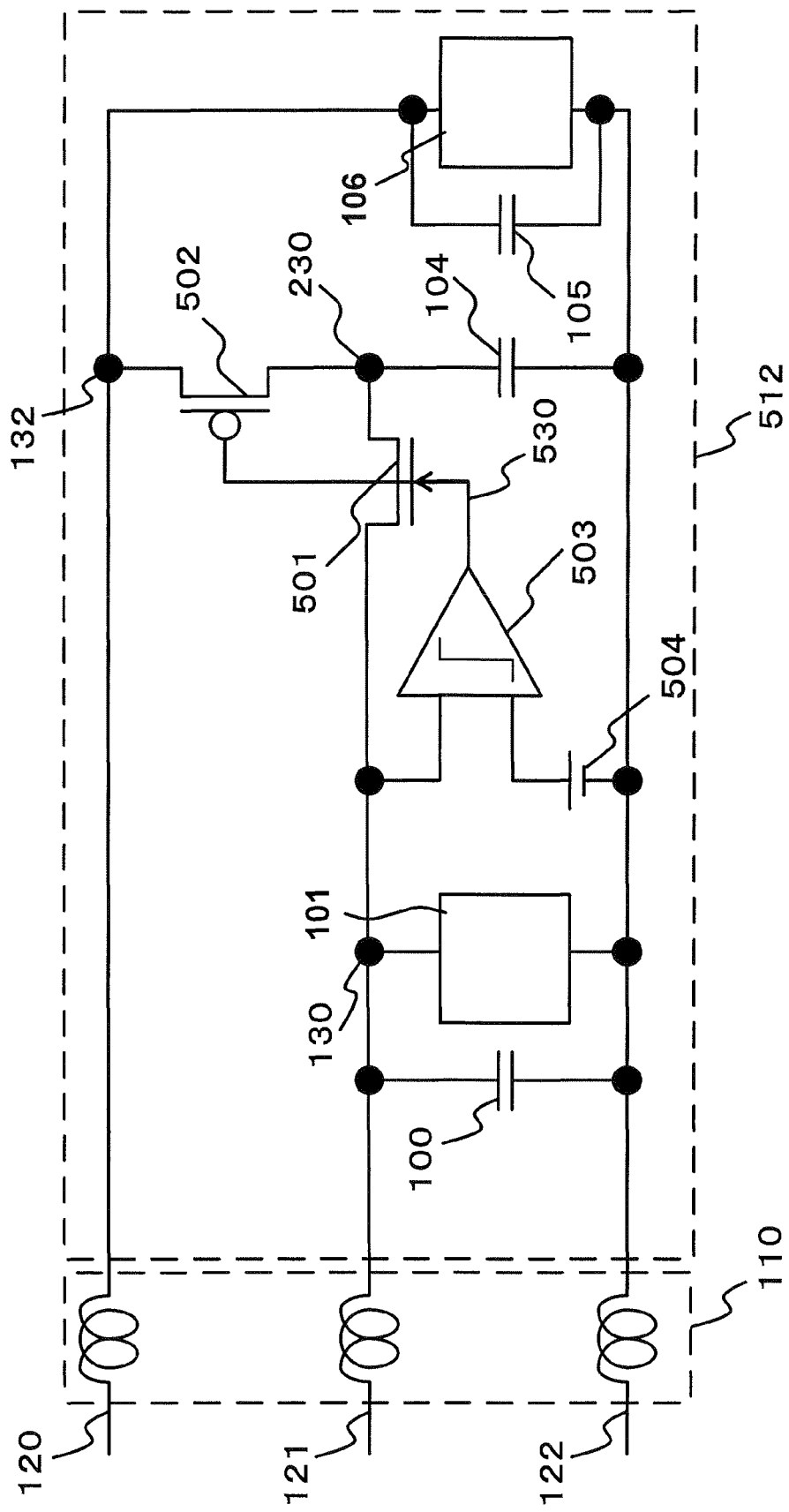
FIG. 4 shows a specific example of a semiconductor circuit.

FIG. 4 shows a specific example of the semiconductor circuit 212 in the semiconductor device in FIG. 3A. In this example, the threshold voltages 123 and 124 are equal, i.e. one threshold is provided. Referring to FIG. 4, a semiconductor circuit 512 includes the lines 120, 121, and 122, the circuits 101 and 106, and the capacitors 100, 104, and 105 in the same case as the semiconductor circuit 212 in FIG. 3A. In FIG. 4, a power compensating circuit includes a comparator 503, a voltage source 504, an n-type MOS transistor 501, a p-type MOS transistor 502, and the capacitor 104. In FIG. 4, the same components as those in FIG. 3 are designated by the same reference numerals and a description thereof is omitted.

Referring to FIG. 4, the n-type MOS transistor 501 corresponds to the switch 201 in FIG. 3A and the p-type MOS transistor 502 corresponds to the switch 202. The source of the transistor 501 is connected to the node 132 and the drain thereof is connected to the node 230. The source of the transistor 502 is connected to the node 132 and the drain thereof is connected to the node 230. The gate of the transistor 501 is electrically connected to that of the transistor 502. The comparator 503 and the voltage source 504 constitute the controller 102. A signal 530 corresponds to the signal 131 and is supplied to the respective gates of the transistors 501 and 502. The voltage of the voltage source 504 is equal to the threshold voltage 123 or 124. The voltage source 504 is realized by, for example, a band-gap reference circuit (BGR).

An operation of the semiconductor circuit 512 will now be described. When a voltage at the node 130 is equal to or lower than the voltage of the voltage source 504 due to the mode switching of the circuit 101, the comparator 503 detects the voltage reduction and outputs the signal 530 at HIGH level. In response to the signal 530, the transistor 501 is turned on and the transistor 502 is turned off. The capacitor 100 is charged through the capacitor 104 and, after that, the voltage at the node 130 is returned to the voltage of the voltage source 504 or higher. Consequently, the logic level of the signal 530 output from the comparator 503 becomes LOW. In response to the signal 530, the n-type MOS transistor 501 is turned ff and the p-type MOS transistor 502 is turned on. This embodiment can be embodied with the above-described circuit operation.

Figure 5:
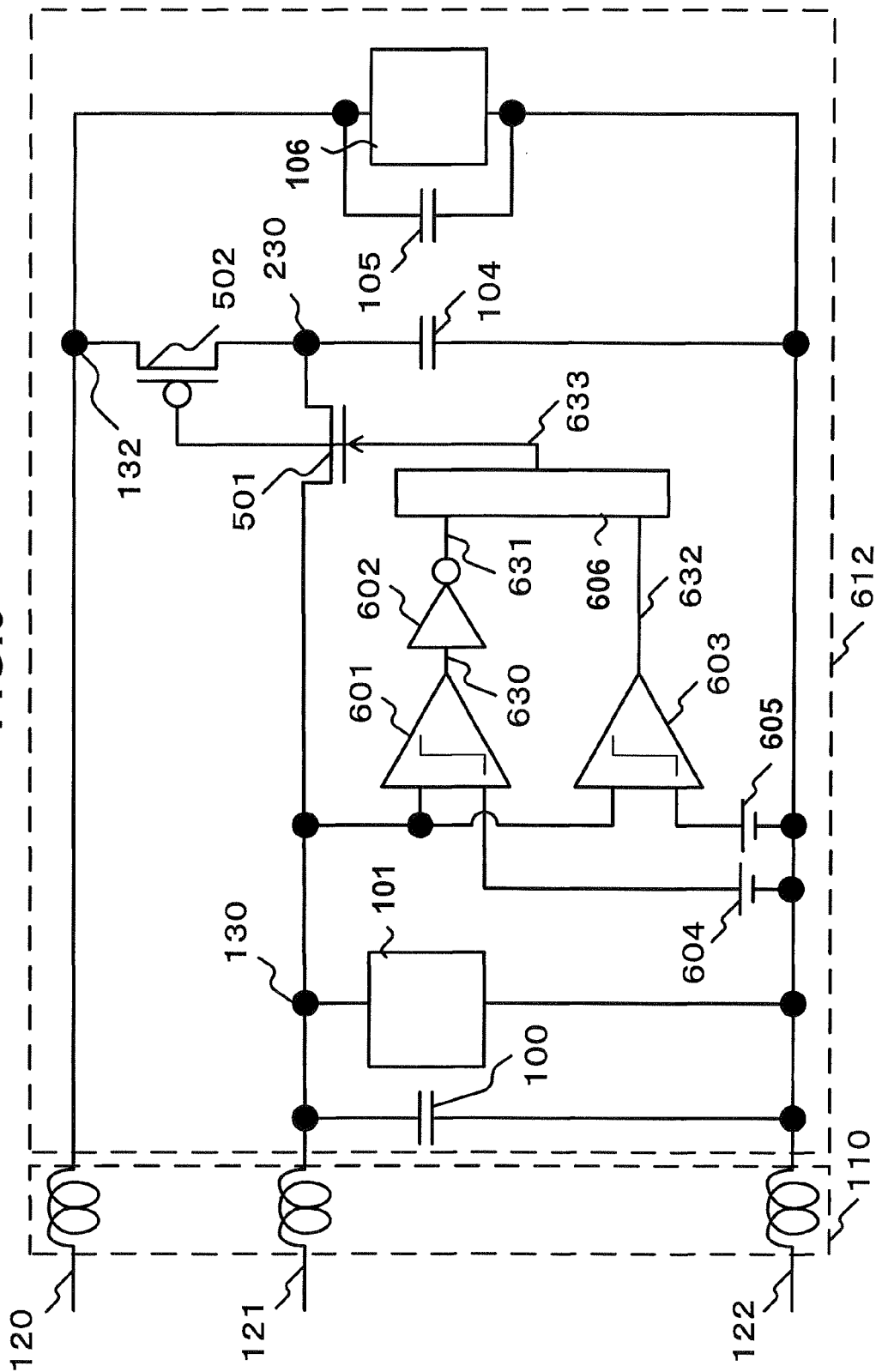
FIG. 5 shows a specific example of the semiconductor circuit.

FIG. 5 shows another specific example of the semiconductor circuit 212 in the semiconductor device shown in FIG. 3A. In this example, the threshold voltages 123 and 124 are different, i.e. two threshold values are provided. Referring to FIG. 5, a semiconductor circuit 612 includes the lines 120, 121, and 122, the circuits 101 and 106, and the capacitors 100, 104, and 105 in the same case as the semiconductor circuit 212 in FIG. 3A. In FIG. 5, the same components as those in FIG. 3A are designated by the same reference numerals and a description thereof is omitted. The power compensating circuit includes comparators 601 and 603, voltage sources 604 and 605, an inverter 602, an RS flip-flop 606, and the transistors 501 and 502.

In the semiconductor circuit 612, the comparators 601 and 603, the voltage sources 604 and 605, the inverter 602, and the RS flip-flop 606 constitute the controller 102. One input terminal of the comparator 601 is connected to the line 121 and the other input terminal thereof is connected to the voltage source 604. One input terminal of the comparator 603 is connected to the line 121 and the other input terminal thereof is connected to the voltage source 605. The voltage of the voltage source 604 is higher than that of the voltage source 605. A signal 630 output from the comparator 601 is logically inverted by the inverter 602 and the inverted signal is supplied as a reset input signal 631 to the RS flip-flop 606. A signal 632 output from the comparator 603 is supplied as a set input signal to the RS flip-flop 606. The RS flip-flop 606 outputs a Q output signal 633.

FIG. 6 is a waveform chart explaining an operation of the semiconductor circuit of FIG. 5. A waveform 550 represents the waveform of a voltage at the node 130. A waveform 551 represents the waveform of a voltage of the signal 630. A waveform 552 represents the waveform of a voltage of the signal 631. A waveform 553 represents the waveform of a voltage of the signal 632. A waveform 554 represents the waveform of a voltage of the signal 633. The threshold voltage 123 is equal to the voltage of the voltage source 604 and the threshold voltage 124 is equal to the voltage of the voltage source 605. The operation of the semiconductor circuit of FIG. 5 will be described below with reference to the waveform chart of FIG. 6.

When the voltage at the node 130 is equal to or lower than the threshold voltage 123 at time T1 due to the mode switching of the circuit 101 as shown by the waveform 550, the comparator 601 outputs a signal at HIGH level as shown by the voltage waveform 551. Consequently, the output signal 631 of the inverter 602, i.e. the reset input signal 631 of the RS flip-flop 606 goes LOW as shown by the waveform 552. At time T1, the output signal 632 of the comparator 603, i.e. the set input signal of the RS flip-flop 606 remains LOW as shown by the waveform 553.

When the voltage at the node 130 is equal to or lower than the threshold voltage 124 at time T2 as shown by the waveform 550, the output signal 632 of the comparator 603 goes HIGH as shown by the waveform 553. Consequently, the output signal 633 of the RS flip-flop 606 goes HIGH as shown by the waveform 554. In response to the signal 633, the transistor 501 is turned on and the transistor 502 is turned off. When the capacitor 100 is charged through the capacitor 104, the potential at the node 130 is increased.

When the voltage at the node 130 is returned to the threshold voltage 124 at time T3 as shown by the waveform 550, the output signal 632 of the comparator 603 becomes LOW. Since the signal 631 is held LOW as shown by the waveform 552, the output signal 633 of the RS flip-flop 606 remains HIGH as shown by the waveform 554.

When the voltage at the node 130 is returned to the threshold voltage 123 at time T4 as shown by the waveform 550, the output signal 630 of the comparator 601 becomes LOW as shown by the waveform 551. Consequently, the reset input signal 631 of the RS flip-flop 606 goes HIGH as shown by the waveform 552. Thus, the output signal 633 of the RS flip-flop 606 becomes LOW as shown by the waveform 554. In response to the signal 633, the transistor 501 is turned off and the transistor 502 is turned on. This embodiment can be embodied with the above-described circuit operation.

In the above-described embodiment, when the switches 201 and 202 are realized by means of transistors, the switching time of each transistor is not negligible. As will be understood from the waveform 253 related to the node 132 in FIG. 3A, amplitude variations are observed at time T1 and T2 at which the switches are turned on and off. Because the switches 201 and 202 are simultaneously turned on at the instant when the two switches are turned on and off, the capacitor 100 is charged by the current flowing from the line 120.

Figure 7A:
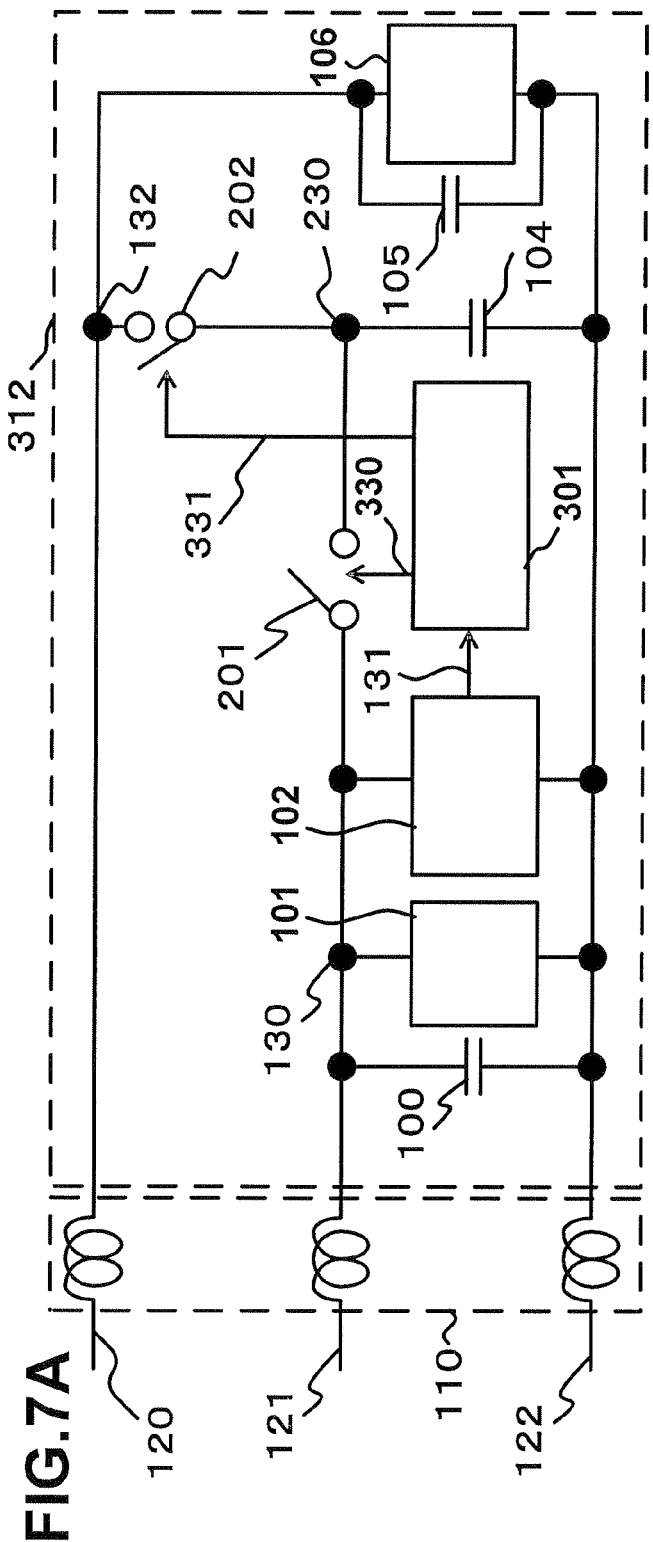
FIG. 7A shows a diagram of a semiconductor device.
Figure 7B:
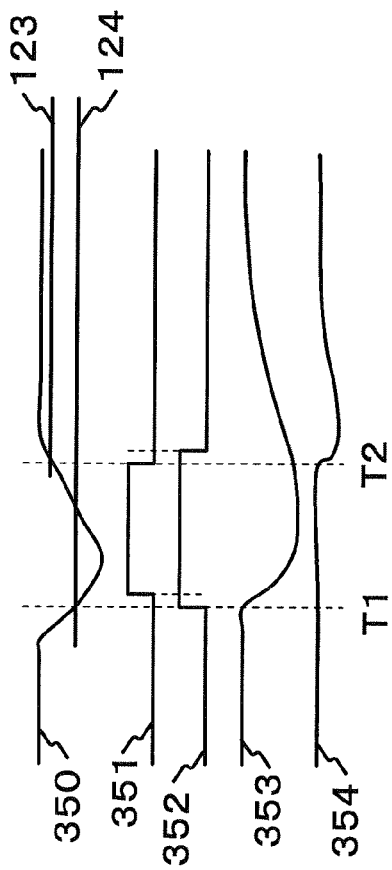
FIG. 7B shows a waveform chart of an operation.

FIG. 7A shows a diagram of a semiconductor device and FIG. 7B shows a waveform chart of an operation thereof. Referring to FIG. 7A, a semiconductor circuit 312 includes the lines 120, 121, and 122, the circuits 101 and 106, the capacitors 100, 104, and 105, the controller 102, and the switches 201 and 202 in the same case as the semiconductor circuit 212 in FIG. 3A. The same components as those in FIG. 3A are designated by the same reference numerals and a description thereof is omitted.

A waveform 350 represents the waveform of a voltage at the node 130, a waveform 351 represents the waveform of a voltage of a signal 330, a waveform 352 represents the waveform of a voltage of a signal 331, a waveform 353 represents the waveform of a voltage at the node 230, and a waveform 354 represents the waveform of a voltage at the node 132. The power compensating circuit includes the controller 102, a delay generator 301, the switches 201 and 202, and the capacitor 104. The delay generator 301, added to the components of the power compensating circuit in the semiconductor circuit 212 in FIG. 3A, receives the signal 131 from the controller 102 and controls the switching operations of the switches 201 and 202 using the signals 330 and 331. The delay generator 301 may be included in the controller 102.

As for the output signal waveforms of the delay generator 301, the amplitude changing timings shown in the voltage waveforms 351 and 352 are deviated from each other at time T1 and time T2, namely, the time at which the voltage amplitude is changed shown in one of the voltage waveforms 351 and 352 is delayed from that in the other voltage waveform at each of time T1 and time T2. This prevents the switches 201 and 202 from being simultaneously turned on as in the case of FIG. 3A. Therefore, amplitude variations, as shown by the voltage waveform 253 in FIG. 3B, are eliminated, thus obtaining the smooth waveform as shown by the waveform 354 in FIG. 7B.

Figure 8A:
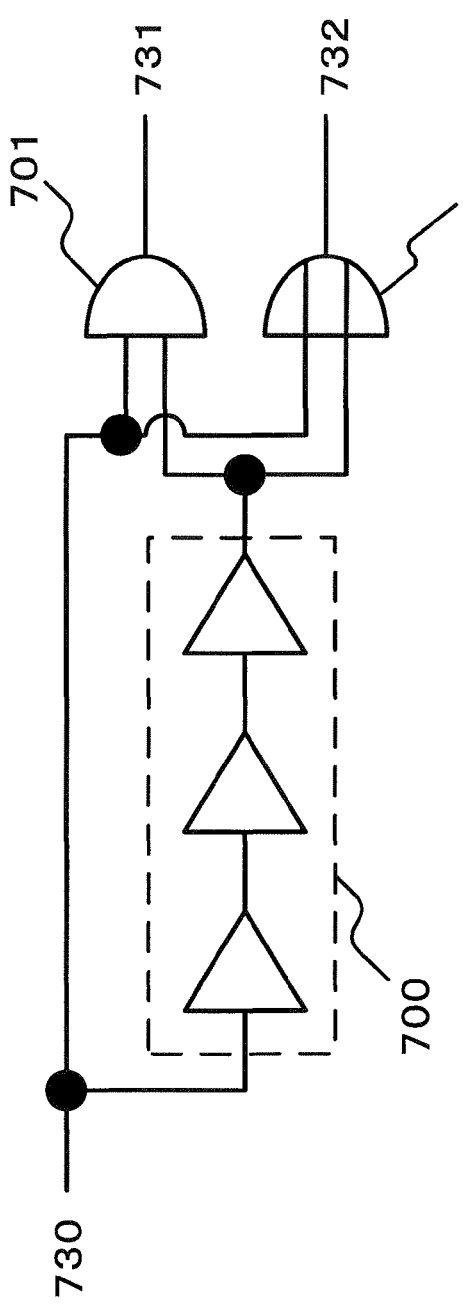
FIG. 8A shows a specific example of a delay generator.
Figure 8B:
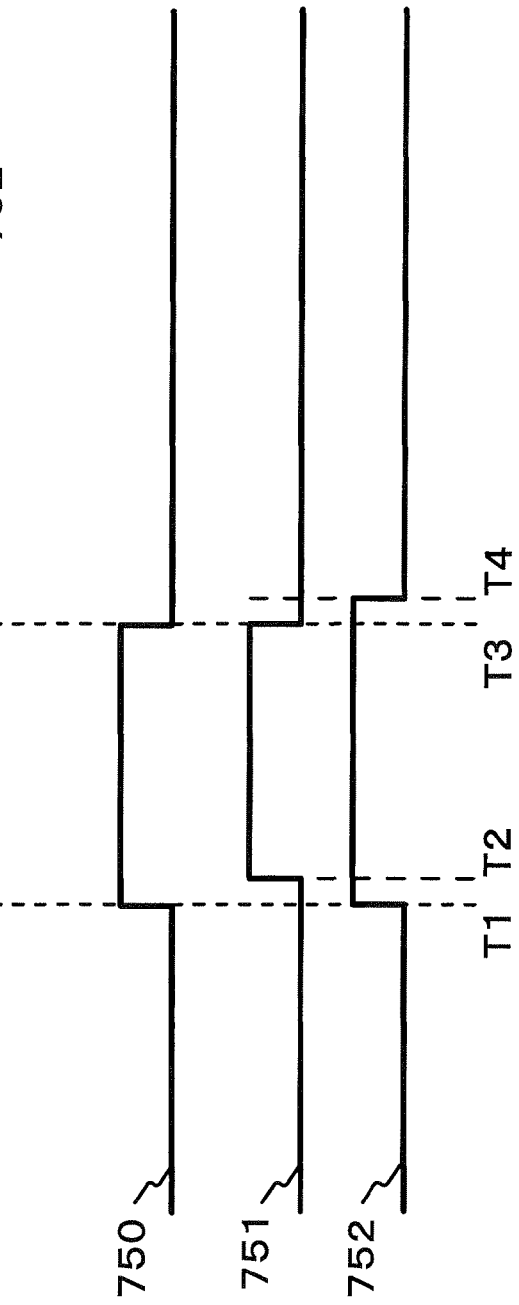
FIG. 8B shows a waveform chart of an operation.

FIG. 8A shows a circuit diagram of the delay generator 301 and FIG. 8B shows a waveform chart of an operation thereof. The delay generator 301 includes a delay circuit 700 including at least one delay buffer, an AND circuit 701, and an OR circuit 702. The AND circuit 701 outputs logical AND of two input signals. The OR circuit 702 outputs logical OR of two input signals. The delay generator 301 receives a signal 730 output from the controller 102 and also outputs control signals 731 and 732 to the switches 201 and 202, respectively. A waveform 750 represents the input signal 730, a waveform 751 represents the output signal 731, and a waveform 752 represents the output signal 732. The operation of the delay generation unit 301 will be described below.

When the input signal 730 goes HIGH at time T1 as shown by the waveform 750, the output signal 732 of the OR circuit 702 becomes HIGH as shown by the waveform 752. Since a signal output from the delay circuit 700 is supplied to one input terminal of the AND circuit 701, the output signal 731 is held LOW at time T1 as shown by the waveform 751.

When the output signal of the delay circuit 700 is supplied to the AND circuit 701 at time T2, the output signal 731 becomes HIGH as shown by the waveform 752 such that the timing at which the signal 731 goes HIGH is delayed from the timing at which the signal 732 goes HIGH. The delay time can be controlled by the number of buffers constituting the delay circuit 700 and the characteristics of the buffers.

When the input signal 730 goes LOW at time T3, the signal supplied to one input terminal of the AND circuit 701 becomes LOW, so that the output signal 731 becomes LOW as shown by the waveform 751. Since a signal supplied to one input terminal of the OR circuit 702 is held HIGH by the delay circuit 700, the output signal 732 remains HIGH as shown by the waveform 752.

When the signal remaining LOW and passing through the delay circuit 700 is supplied to the OR circuit 702 at time T4, the output signal 732 becomes LOW such that the timing at which the signal 732 goes LOW as shown by the waveform 752 is delayed from the timing at which the signal 731 goes LOW as shown by the waveform 751.

As described above, the control signals 731 and 732 for the switches 201 and 202 can be output at different timings, thus preventing the two switches from being simultaneously turned on.

In the foregoing embodiment shown in FIG. 7B, an amplitude variation does not occur at time T1 in the voltage waveform 354. However, an amplitude variation occurs at time T2. The reason is that the capacitor 104 is rapidly charged by current flowing from the node 132 at time T2 at which the switch 202 is turned on. An object of the present technique is to suppress a variation in power supply voltage supplied to the circuit 101 caused upon mode switching of the circuit 101. The number of mode switching times is approximately 100 times per second at the maximum. After the mode is switched to the other mode, charging the capacitor 104 may be completed until the next mode switching.

FIG. 9A is a diagram of a semiconductor device and FIG. 9B shows a waveform chart of an operation thereof. A semiconductor circuit 412 includes the lines 120, 121, 122, the circuits 101 and 106, the capacitors 100, 104, and 105, the controller 102, the delay generator 301, and the switches 201 and 202 in the same case as the semiconductor circuit 312 in FIG. 7A. In FIG. 9A, the same components as those in FIG. 7A are designated by the same reference numerals and a description thereof is omitted. The power compensating circuit of the semiconductor circuit 412 in FIG. 9A includes the controller 102, the delay generator 301, the switches 201 and 202, the capacitor 104, and the current limiting element 400. The current limiting element 400, added to the same components as those of the semiconductor circuit 312 in FIG. 7A, is arranged between the nodes 132 and 230. The current limiting element 400 limits the amount of current flowing into the capacitor 104 via the node 132 during the turn-on of the switch 202.

Referring to FIG. 9B, a waveform 451 represents the waveform of a voltage at the node 120, a waveform 452 represents the waveform of a voltage of the signal 330, a waveform 453 represents the waveform of a voltage of the signal 331, a waveform 454 represents the waveform of a voltage at the node 230, and a waveform 455 represents the waveform of a voltage at the node 132. Voltage waveforms 454a and 455a represent waveforms obtained before the current limiting element 400 is mounted, that is, they are the same as the waveforms 353 and 354 in FIG. 7B. Voltage waveforms 454b and 455b represent waveforms obtained after the current limiting element 400 is mounted.

As for the components constituting the power compensating circuit in FIG. 9A, the specific components excluding the current limiting element 400 are the same as those in FIGS. 4, 5, and 8A. The current limiting element 400 includes, for example, a resistor and limits the amount of current flowing into the capacitor 104 from the node 132 during the turn-on of the switch 202. Consequently, the rate of charging the capacitor 104 is lowered as shown by the voltage waveform 454b. Thus, a voltage variation that accompanies charging of the capacitor 104 is reduced, so that the change in voltage at the node 132 decreases as shown by the voltage waveform 455b.

In the case where the current limiting element 400 includes a resistor, the charging time of the capacitor 104 is determined on the basis of the time constant CR of the resistance R of the resistor and the capacitance C of the capacitor 104. As described above, charging the capacitor 104 may be completed until the next mode switching of the circuit 101. Therefore, when the mode switching period T of the circuit 101 is known, the settable resistance R can be obtained as follows.

$$C \times R \leq T$$

The transistor 502 in FIG. 4 may be used as the current limiting element 400. Specifically, a process of manufacturing the transistor 502 is controlled so that the on-resistance of the transistor is equal to the resistance R. Consequently, it is unnecessary to arrange a resistor outside the semiconductor device, so that the area of the semiconductor device for mounting can be reduced.

What is claimed is:

1. A semiconductor device comprising:
a reference line;
a first line provided with a first voltage with respect to the reference line;
a second line provided with a second voltage not less than the first voltage with respect to the reference line;
a capacitor having a first capacitance arranged between the reference line and the second line;
a current limiting element arranged between the capacitor and the second line, for charging up the capacitor, the current limiting element limiting current flowing into the capacitor from the second line during charging up;
a first switch connected between the first line and the capacitor; and
a controller for controlling the first switch to discharge the capacitor.

2. The semiconductor device of claim 1, further comprising a first circuit connected between the reference line and the first line, the first circuit being driven by the first voltage, wherein the first circuit intermittently performs changing among a plurality of operation modes having different power consumptions, and the current limiting element has such a resistance that the time constant determined by the product of the resistance and the first capacitance is not greater than the period of switching between the operation modes.

3. The semiconductor device of claim 1, wherein the current limiting element is formed by a second switch, and the controller controls the first switch and the second switch so as to compensate for fluctuation of the voltage level of the first line.

4. The semiconductor device of claim 3, further comprising a first circuit connected to the reference line and the first line, the circuit being driven by the first voltage.

5. The semiconductor device of claim 4, wherein the first circuit intermittently performs changing among a plurality of operation modes having different power consumptions, and the second switch is formed by a transistor having such a resistance that the time constant determined by the product of the resistance and the first capacitance is not greater than the period of switching between the operation modes, the resistance existing while the transistor turns on.

6. The semiconductor device of claim 3, wherein the first switch is formed by a first transistor, the second switch is formed by a second transistor, and the first transistor and the second transistor receive control signals outputted from the controller, respectively.

7. The semiconductor device of claim 3, wherein the controller turns on and off either of the first and second switches complementarily.

8. The semiconductor device of claim 3, wherein the controller further comprises a delay generator that outputs a first control signal for controlling the first switch, and outputs a second control signal for controlling the second switch such that the output timing of the second control signal is deviated from the output timing of the first control signal.

9. The semiconductor device of claim 8, wherein the delay generator comprises:
a delay circuit for receiving an output signal of the controller and generating a delayed output signal by a predetermined time with respect to the input signal;
a first logic circuit outputting logical AND of the output signal of the controller and the delayed output signal as the first control signal; and
a second logic circuit outputting logical OR of the output signal of the controller and the delayed output signal as the second control signal.

10. The semiconductor device of claim 1, wherein the controller receives at least one threshold voltage serving as a reference for detecting fluctuation of the voltage level of the first line.

11. The semiconductor device of claim 10, wherein the controller comprises a first comparator in which an input terminal is connected to the first line and an another input terminal is supplied with the first threshold voltage, the first comparator outputting a control signal for controlling the first switch.

12. The semiconductor device of claim 11, wherein the controller further comprises:
a second comparator having an input terminal connected to the first line and an another input terminal supplied with a second threshold voltage having a voltage lower than the first threshold voltage;
an inverter for inverting an output of the first comparator; and
an RS flip-flop receiving an output of the inverter as a reset input signal, the RS flip-flop receiving an output of the second comparator as a set input signal, the RS flip-flop outputting a control signal for controlling the first switch.

* * * * *